US012785275B2

(12) United States Patent
Lee et al.

(10) Patent No.: US 12,785,275 B2
(45) Date of Patent: Nov. 3, 2026

(54) WAVEGUIDE ANTENNA STRUCTURE

(71) Applicant: HL KLEMOVE CORPORATION, Incheon (KR)

(72) Inventors: Hyunseok Lee, Incheon (KR); Sung Joon Heo, Incheon (KR)

(73) Assignee: HL KLEMOVE CORPORATION, Incheon (KR)

( * ) Notice: Subject to any disclaimer, the term of this patent is extended or adjusted under 35 U.S.C. 154(b) by 41 days.

(21) Appl. No.: 18/909,674

(22) Filed: Oct. 8, 2024

(65) Prior Publication Data

US 2025/0329928 A1 Oct. 23, 2025

(30) Foreign Application Priority Data

Apr. 19, 2024 (KR) ........................ 10-2024-0052517

(51) Int. Cl.

*H01Q 13/06* (2006.01)
*H01Q 5/55* (2015.01)
*H01Q 13/18* (2006.01)
*H01Q 13/20* (2006.01)

(52) U.S. Cl.

CPC ............... *H01Q 5/55* (2015.01); *H01Q 13/20* (2013.01)

(58) Field of Classification Search

CPC ............ H01Q 1/38; H01Q 5/55; H01Q 13/18; H01Q 13/20; H01Q 13/106; H01Q 21/0043; H05K 1/115

See application file for complete search history.

(56) References Cited

U.S. PATENT DOCUMENTS

| | | | | |
|---|---|---|---|---|
| 2016/0126637 | A1* | 5/2016 | Uemichi | H01Q 21/0043 343/771 |
| 2020/0220273 | A1* | 7/2020 | Ahmadloo | H01Q 21/0043 |
| 2022/0302600 | A1* | 9/2022 | Shi | H01Q 13/0233 |
| 2023/0099058 | A1* | 3/2023 | Ikegami | H01Q 15/22 343/767 |

FOREIGN PATENT DOCUMENTS

| | | | |
|---|---|---|---|
| KR | 20190010991 | A | 2/2019 |
| KR | 20220057731 | A | 5/2022 |

OTHER PUBLICATIONS

Petroutsos et al., "5G Multilayer Slot Array Antenna Fed by Integrated Substrate Groove Gap Waveguide for 26 GHz Band", 2023 IEEE International Symposium on Antennas and Propagation and USNC-URSI Radio Science Meeting, Jul. 2023 (Year: 2023).*

* cited by examiner

*Primary Examiner* — Dimary S Lopez Cruz
*Assistant Examiner* — Marin Stoytchev Stoytchev
(74) *Attorney, Agent, or Firm* — Seed Intellectual Property Law Group LLP

(57) ABSTRACT

A waveguide antenna structure is provided. A waveguide antenna structure according to one embodiment of the present disclosure includes a base layer in which a feed hole is formed, a waveguide layer laminated on the base layer and including a waveguide communicating with the feed hole, an antenna layer laminated on the waveguide layer and including an antenna for transmitting or receiving a signal passing through the feed hole and the waveguide to or from an outside, and a metal cover layer laminated on the antenna layer and including a first opening surrounding the antenna to change a path of a radio wave transmitted or received through the antenna.

18 Claims, 17 Drawing Sheets

(a)

(b)

(a)

(b)

(b)

(a)

(b)

WAVEGUIDE ANTENNA STRUCTURE

CROSS-REFERENCE TO RELATED APPLICATION

This application claims priority to and the benefit of Korean Patent Application No. 10-2024-0052517, filed on Apr. 19, 2024, the disclosure of which is incorporated herein by reference in its entirety.

BACKGROUND

Technical Field

The present disclosure relates to a waveguide antenna structure, and more specifically, to a printed circuit board (PCB) laminated waveguide antenna structure including a metal cover layer.

Discussion of Related Art

Recently, antennas used in radars have been changed and developed from printed circuit board (PCB) type antennas to waveguide type antennas.

Conventional waveguide type antennas have been manufactured with aluminum structures or plastic injection structures, and in these structures, a structure for transitioning a signal from a micro strip to a waveguide is required to transmit the signal to an antenna.

However, such a method has disadvantages in terms of price, antenna manufacturing and fastening, and signal loss.

Accordingly, a waveguide antenna technology that does not have a structure for transitioning a signal from a microstrip to a waveguide in a waveguide type antenna is required.

In addition, when such a waveguide antenna structure is developed, a waveguide antenna technology for designing various signal characteristics and signal paths of radio frequency (RF) signals is required.

BRIEF SUMMARY

The present disclosure is directed to solving the above-described problems and providing a direct feed type waveguide antenna structure.

The present disclosure is also directed to providing an antenna structure in which a waveguide is formed by laminating a printed circuit board (PCB).

The present disclosure is also directed to providing an antenna structure in which a metal cover layer having an opening formed therein is laminated on a waveguide antenna formed by laminating a PCB to change a path or characteristics of a radio frequency (RF) signal using the opening formed in the metal cover layer.

The objects of the present disclosure are not limited to the above-described objects, and other objects that are not mentioned will be able to be clearly understood by those skilled in the art to which the present disclosure pertains from the following description.

According to an aspect of the present disclosure, there is provided a waveguide antenna structure including a base layer in which a feed hole is formed, a waveguide layer laminated on the base layer and including a waveguide communicating with the feed hole, an antenna layer laminated on the waveguide layer and including an antenna for transmitting or receiving a signal passing through the feed hole and the waveguide to or from an outside, and a metal cover layer laminated on the antenna layer and including a first opening surrounding the antenna to change a path of a radio wave transmitted or received through the antenna.

In this case, each of the metal cover layer, the antenna layer, the waveguide layer, and the base layer may include a substrate layer and a first protection layer and a second protection layer laminated on an upper surface and a lower surface of the substrate layer, respectively.

In this case, the substrate layer may be formed of a flame retardant FR-4 material, and the first protection layer and the second protection layer may be formed of a conductive material that allows plating to be performed thereon.

In this case, a plurality of via holes passing through the base layer, the waveguide layer, and the antenna layer which are laminated on each other may be formed in the base layer, the waveguide layer, and the antenna layer, and the plurality of via holes may be disposed to surround the feed hole, the waveguide, and the antenna when viewed in a first direction in which the layers are laminated.

In this case, the plurality of via holes may be disposed in a rectangular shape in one column, and an arrangement length of the plurality of via holes disposed in an extension direction of the waveguide may be formed to be greater than a length of the plurality of via holes disposed in a width direction.

In this case, the antenna may be a slot antenna, and the slot antenna may include a plurality of slots disposed in an upper portion thereof in an extension direction of the waveguide.

In this case, the plurality of slots may be arranged in two columns in the extension direction of the waveguide, and adjacent slots may be misaligned with each other.

In this case, the first opening may be formed in a rectangular shape surrounding the plurality of slots and extending in the extension direction of the waveguide.

In this case, a center of the first opening in a width direction may be formed to match a center of the plurality of slots in a width direction.

In this case, a center of the first opening in a width direction may be laterally offset toward one side from a center of the plurality of slots in a width direction.

In this case, a pattern of consecutive triangular, semicircular, or quadrangular shapes may be formed on each of both sides of an inner surface of the first opening in an extension direction.

In this case, a second opening which has a rectangular shape and is parallel to the first opening may be formed at one side or each of both sides of the first opening.

In this case, a size and a shape of the second opening may correspond to the first opening.

In this case, the second opening may be disposed as one or more second openings at one side or each of both sides of the first opening, and the one or more second openings may be disposed at the one or each of both sides of the first opening in parallel to be spaced apart from each other.

In this case, an inner surface of the first opening may be formed as a vertical surface perpendicular to the antenna layer or an inclined or curved surface of which a width increases upward.

In this case, a width of the first opening may range from zero to 1.5$\lambda$.

In this case, a thickness of the metal cover layer may range from zero to 2$\lambda$.

Meanwhile, according to another aspect of the present disclosure, there is provided a waveguide antenna structure including a base layer in which a feed hole is formed, a waveguide layer laminated on the base layer and including a waveguide communicating with the feed hole, an antenna layer laminated on the waveguide layer and including an antenna for transmitting or receiving a signal passing through the feed hole and the waveguide to or from an outside, and a metal cover layer laminated on the antenna layer and including one or more openings having a quadrangular shape extending in an extension direction of the waveguide.

In this case, when the number of the openings is two or more, any one of the openings may be formed to surround the antenna, and the remaining openings may be disposed beside the opening surrounding the antenna in parallel to be spaced apart from each other.

In this case, a center of the opening surrounding the antenna in a width direction may match or be offset from a center of the antenna in a width direction.

In this case, a pattern of consecutive triangular, semicircular, or quadrangular shapes may be formed on each of both sides of an inner surface of the opening in an extension direction.

In this case, the opening may be formed as an inner surface perpendicular to the antenna layer, or as an inclined or curved surface of which a width increases upward.

In this case, a width of the opening may range from zero to 1.5λ.

In this case, a thickness of the metal cover layer may range from zero to 2λ.

BRIEF DESCRIPTION OF THE SEVERAL VIEWS OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Figure 1:
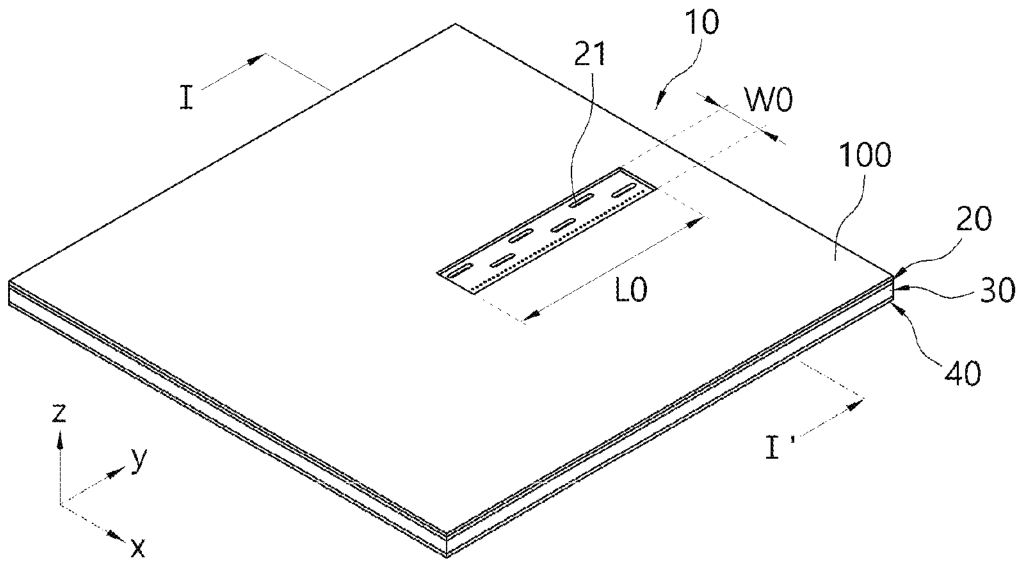
FIG. 1 is a perspective view illustrating a printed circuit board (PCB) laminated waveguide antenna in a direct feed type on which a metal cover layer is laminated according to a first embodiment of the present disclosure.

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limitedly construed as their ordinary or dictionary meanings, and should be construed as meaning and concept consistent with the technical spirit of the present disclosure in accordance with the principle that the inventors can define terms and concepts in order to best describe their disclosure.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof.

Terms and words used in the present specification and claims should not be interpreted as being limited to commonly used meanings or meanings in dictionaries and should be interpreted as having meanings and concepts which are consistent with the technological scope of the present disclosure based on the principle that the inventors have appropriately defined concepts of the terms in order to describe the present disclosure in the best way.

Therefore, since the embodiments described in the present specification and components illustrated in the drawings correspond to some exemplary embodiments and do not represent all the technological spirit of the present disclosure, there may be various equivalents or modifications replacing the corresponding components at the time of filing of the present disclosure.

Figure 2:
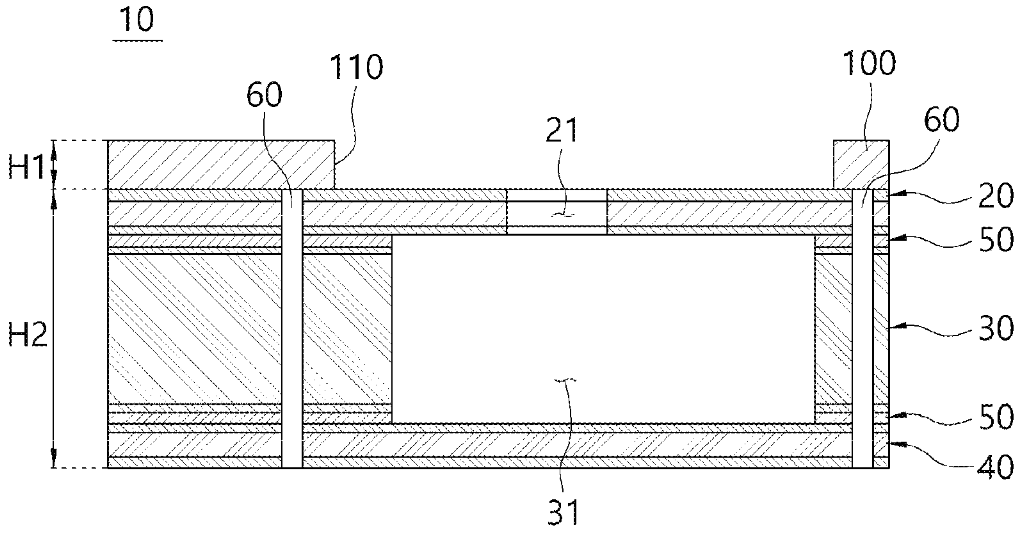
FIG. 2 is a partial cross-sectional view illustrating the PCB laminated waveguide antenna in a direct feed type on which a metal cover layer is laminated according to the first embodiment of the present disclosure along line I-I' of FIG. 1.
Figure 3:
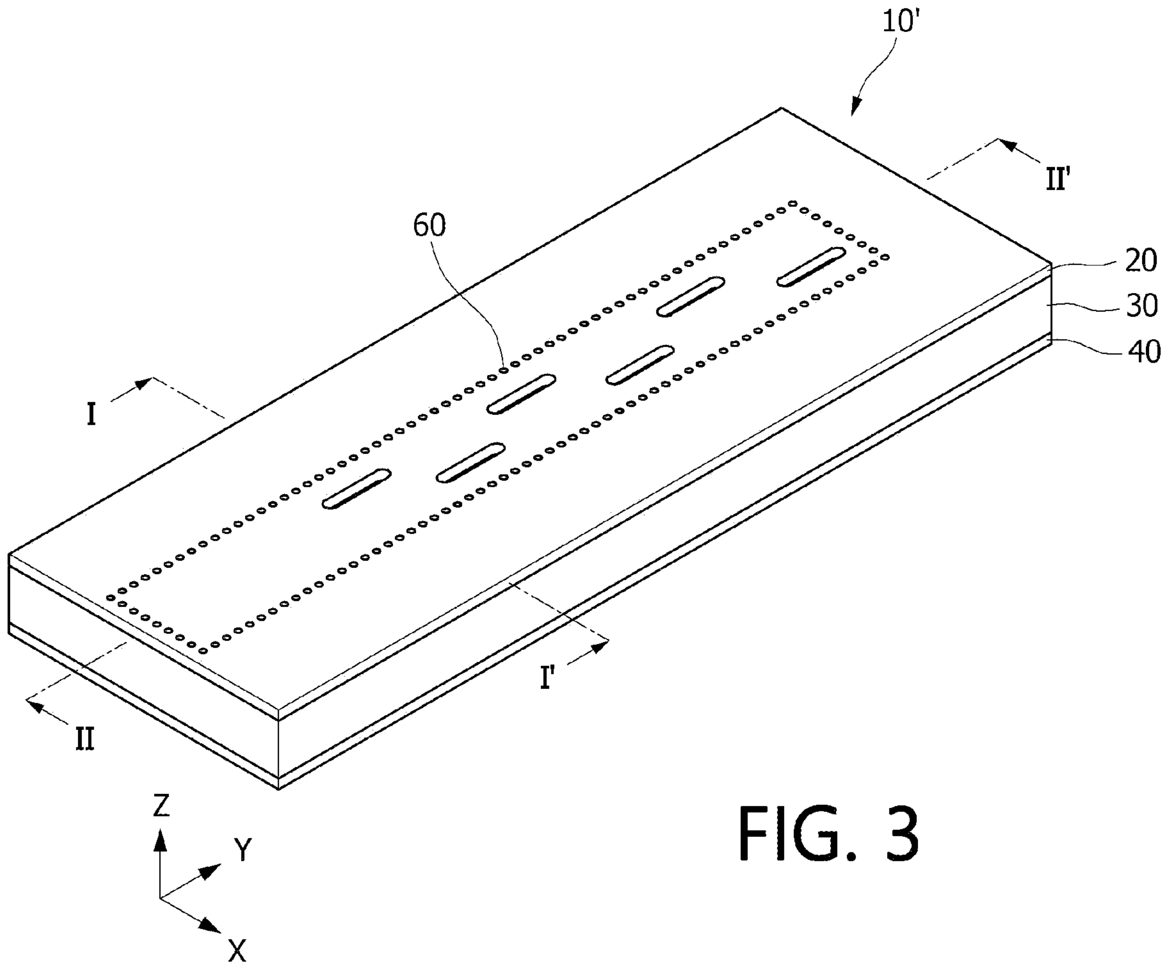
FIG. 3 is a perspective view illustrating the PCB laminated waveguide antenna in a direct feed type in which the metal cover layer in FIG. 1 is omitted.
Figure 4:
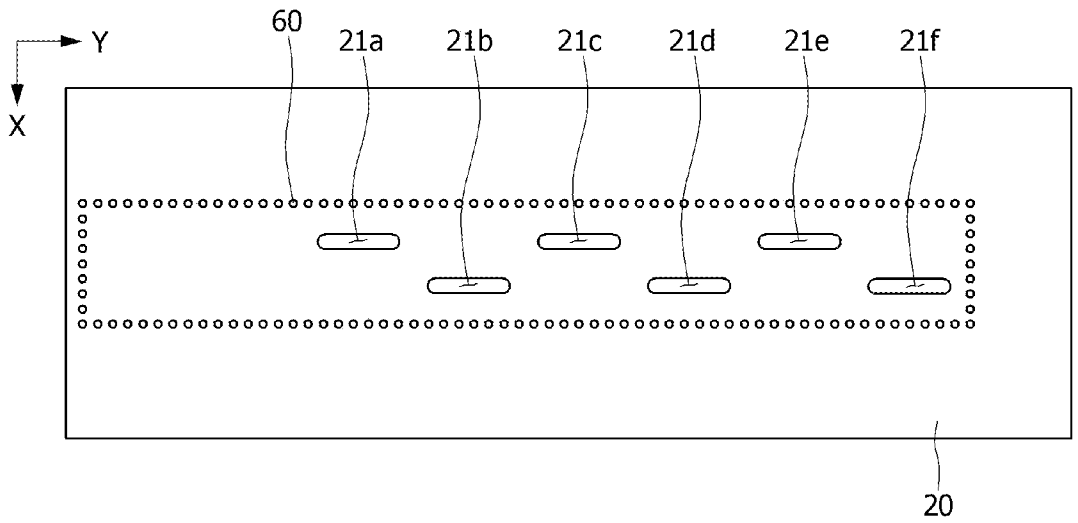
FIG. 4 is a plan view illustrating the PCB laminated waveguide antenna in a direct feed type in which the metal cover layer in FIG. 1 is omitted.
Figure 5:
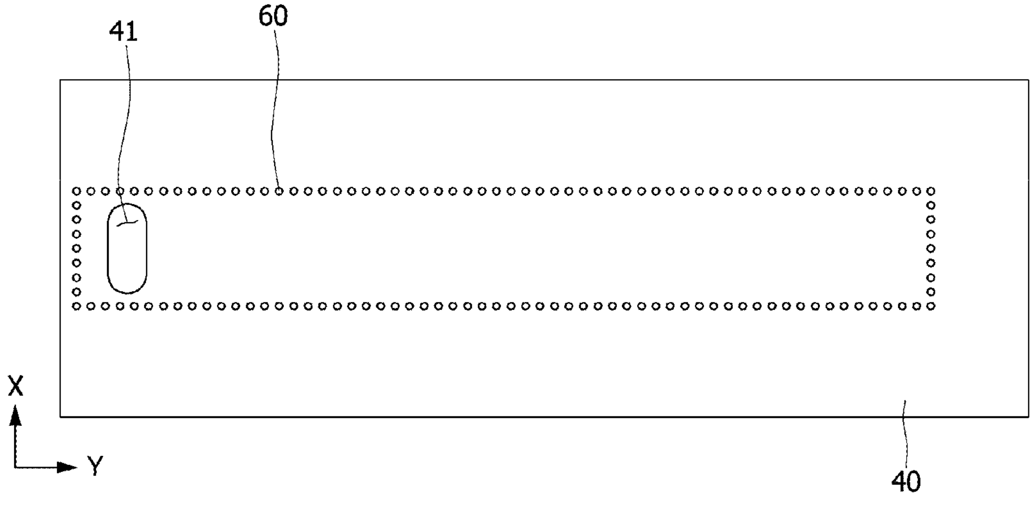
FIG. 5 is a bottom view illustrating the PCB laminated waveguide antenna in a direct feed type in which the metal cover layer in FIG. 1 is omitted.
Figure 6:
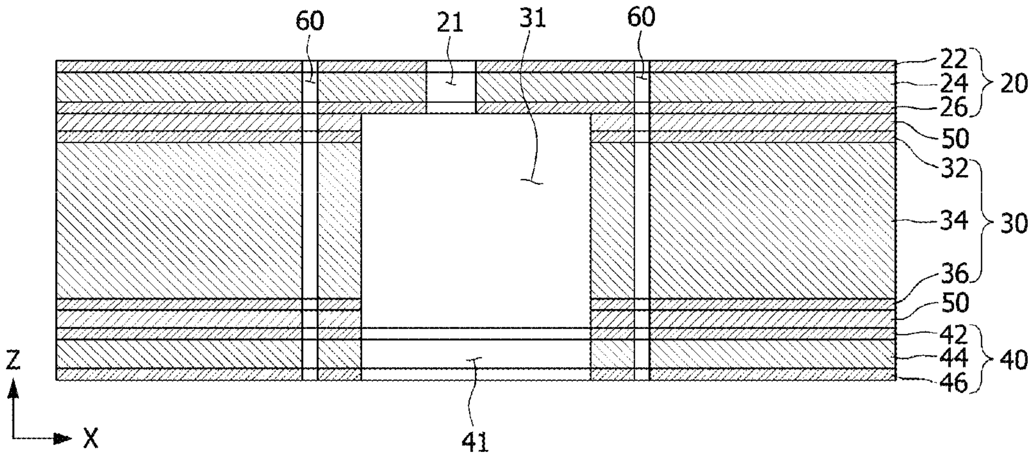
FIG. 6 is a cross-sectional view illustrating the PCB laminated waveguide antenna in a direct feed type along line I-I' of FIG. 1 in which the metal cover layer is omitted.
Figure 7:
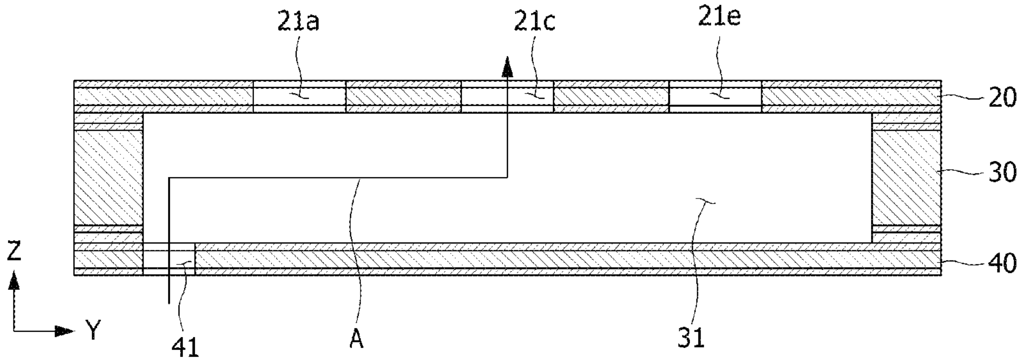
FIG. 7 is a cross-sectional view illustrating the PCB laminated waveguide antenna in a direct feed type according to one embodiment of the present disclosure along line II-II' of FIG. 3 in which the metal cover layer is omitted.

FIG. 1 is a perspective view illustrating a printed circuit board (PCB) laminated waveguide antenna in a direct feed type on which a metal cover layer is laminated according to a first embodiment of the present disclosure. FIG. 2 is a partial cross-sectional view illustrating the PCB laminated waveguide antenna in a direct feed type on which a metal cover layer is laminated according to the first embodiment of the present disclosure along line I-I' of FIG. 1. FIG. 3 is a perspective view illustrating the PCB laminated waveguide antenna in a direct feed type in which the metal cover layer in FIG. 1 is omitted. FIG. 4 is a plan view illustrating the PCB laminated waveguide antenna in a direct feed type in which the metal cover layer in FIG. 1 is omitted. FIG. 5 is a bottom view illustrating the PCB laminated waveguide antenna in a direct feed type in which the metal cover layer in FIG. 1 is omitted. FIG. 6 is a cross-sectional view illustrating the PCB laminated waveguide antenna in a direct feed type along line I-I' of FIG. 1 in which the metal cover layer is omitted. FIG. 7 is a cross-sectional view illustrating the PCB laminated waveguide antenna in a direct feed type according to one embodiment of the present disclosure along line II-II' of FIG. 3 in which the metal cover layer is omitted. In the present specification, the PCB laminated waveguide antenna structure in a direct feed type on which a metal cover layer is laminated is illustrated with a reference numeral of 10 in FIG. 1, and the PCB laminated waveguide antenna structure in a direct feed type in which the metal cover layer is omitted as illustrated in FIG. 3 is illustrated with 10'.

Referring to FIGS. 1 to 7, a waveguide antenna structure 10 according to one embodiment of the present disclosure includes a metal cover layer 100, an antenna layer 20, a waveguide layer 30, and a base layer 40.

In the waveguide antenna structure 10 according to one embodiment of the present disclosure, the metal cover layer 100 is located at an uppermost portion, and the antenna layer 20, the waveguide layer 30, and the base layer 40 are sequentially located under the metal cover layer 100 to form the waveguide antenna structure 10.

In this case, as illustrated in FIG. 2, a thickness of the metal cover layer 100 of the waveguide antenna structure 10 is defined and will be described as a thickness H1, and a total thickness of the antenna layer 20, the waveguide layer 30, and the base layer 40 is defined and will be described as a thickness H2.

Hereinafter, when the waveguide antenna structure 10 according to one embodiment of the present disclosure is described, the antenna layer 20, the waveguide layer 30, and the base layer 40 which are a basic structure of the waveguide antenna structure will be described first, and the metal cover layer 100 disposed on the antenna layer 20 will be described in detail.

Referring to FIGS. 2 to 4, the antenna layer 20 is a layer which is disposed on the waveguide layer 30 and in which an antenna, through which a radio frequency (RF) signal transmitted through a waveguide which will be described below is transmitted or received, is disposed in the waveguide antenna structure 10 according to one embodiment of the present disclosure.

In one embodiment of the present disclosure, the antenna formed in the antenna layer 20 may be a slot antenna. However, the antenna formed in the antenna layer 20 is not limited thereto, and an antenna formed in one of various types, such as a horn antenna or patch antenna, capable of transmitting or receiving an RF signal may be used as the antenna.

In the present embodiment, referring to FIGS. 1 to 4, the slot antenna formed in the antenna layer 20 may include a plurality of antenna holes 21.

As illustrated in FIGS. 1 to 4, the plurality of antenna holes 21 may include six slots 21*a*, 21*b*, 21*c*, 21*d*, 21*e*, and 21*f* arranged in two columns in a y-axis direction in FIG. 4.

In the present embodiment, the six slots 21*a*, 21*b*, 21*c*, 21*d*, 21*e*, and 21*f* are formed to vertically pass through the antenna layer 20. In this case, the six slots 21*a*, 21*b*, 21*c*, 21*d*, 21*e*, and 21*f* are arranged to be alternate between adjacent slots to transmit or receive an RF signal transmitted through the waveguide.

Shapes, sizes, and an arrangement of the six slots may be changed according to an operation frequency, performance, and the like of a transmitted or received RF signal. Since the arrangement and configuration of the slot antenna are known, the detailed description thereof will be omitted.

Referring to FIG. 6, in one embodiment of the present disclosure, the antenna layer 20 may include a first substrate 24 and a first protection layer 22 and a second protection layer 26 which are respectively formed on an upper surface and a lower surface of the first substrate 24 in FIG. 6. The first protection layer and the second protection layer may be formed of a conductive material that allows plating to be performed thereon, for example, formed in the form in which a copper foil and a copper plated layer are combined.

In this case, the first substrate 24 may be formed of a material such as a flame retardant FR-4. However, the material forming the first substrate 24 is not limited thereto, and the first substrate 24 may be formed of a known material capable of forming a substrate.

In this case, the first substrate 24 may be formed in a thin plate shape. In this case, a thickness of the first substrate 24 may vary according to the antenna and an operation frequency and performance of the waveguide and be changed according to a design.

Meanwhile, each of the first protection layer 22 and the second protection layer 26 of the first substrate 24 may be formed in the form in which the copper foil and the copper plated layer are combined. A thickness of the antenna layer 20 may be changed according to a thickness of each of the first protection layer 22 and the second protection layer 26.

Referring to FIG. 6, the waveguide layer 30 is coupled to a lower portion of the antenna layer 20.

The waveguide layer 30 may include a second substrate 34 and a first protection layer 32 and a second protection layer 36 respectively formed on an upper surface and a lower surface of the second substrate 34.

The second substrate 34 may be formed of a material, such as FR-4, like the first substrate 24. However, the material of the second substrate 34 is not limited thereto.

In addition, the first protection layer 32 and the second protection layer 36 formed on the upper surface and the lower surface of the second substrate 34 may be formed like the first protection layer 22 and the second protection layer 26 formed on the first substrate.

Referring to FIGS. 6 and 7, a waveguide 31 is formed in the second substrate 34.

As seen from FIGS. 6 and 7, the waveguide 31 may be formed to have a rectangular cross section having a length extending in the y-axis direction and a rectangular cross section having a predetermined width and a predetermined height in an x-axis direction.

An inner portion of the waveguide 31 may be filled with air. In this case, a design of the width and the height in the x-axis direction and the length in the y-axis direction of the waveguide 31 may be changed according to a frequency and performance of an RF signal. In FIG. 7, an arrow A denotes a moving direction of the RF signal moving from the base layer to the antenna layer. According to one embodiment of the present disclosure, a plurality of waveguides may be formed in the second substrate to form the waveguide antenna structure, and the plurality of waveguides each may correspond to and be connected to a plurality of feed holes. In this case, each of the plurality of waveguides may be used for transmission or reception. One waveguide antenna structure may include at least one transmission waveguide and at least one receiving waveguide. In the present specification, a structure in which one waveguide 31 is connected to one feed hole 41 in the waveguide antenna structure is illustrated for simplifying the drawings.

In one embodiment of the present disclosure, the antenna layer 20 and the waveguide layer 30 may be bonded by a bonding layer 50. The bonding layer 50 may be formed of an adhesive such as a bonding sheet, prepreg, or glue.

Meanwhile, referring to FIGS. 6 and 7, the base layer 40 is coupled to a lower portion of the waveguide layer 30.

The base layer 40 may include a third substrate 44 and a first protection layer 42 and a second protection layer 46 formed on an upper surface and a lower surface of the third substrate 44.

The third substrate 44 may be formed of an FR-4 material similar to the first substrate 24 and the second substrate 34. However, the material forming the third substrate 44 is not limited thereto, and the third substrate 44 may be formed of a known material capable of forming a substrate.

The third substrate 44 may be formed in a thin plate shape. The first protection layer 42 and the second protection layer 46 formed on the upper surface and the lower surface of the third substrate 44 may be formed like the first protection layers 22 and 32 and the second protection layers 26 and 36 formed on the first substrate 24 and the second substrate 34.

In one embodiment of the present disclosure, the feed hole 41 is formed in the base layer 40 to vertically pass therethrough. The feed hole 41 is a hole through which an RF signal directly fed from an RF signal generator (not shown) passes.

Referring to FIG. 7, in one embodiment of the present disclosure, an upper portion of the feed hole 41 is connected to one end portion of the waveguide 31, and thus, an RF signal may pass through the feed hole 41 and the inner portion of the waveguide 31 and be propagated to the outside through the antenna layer 20.

An area of a region in which the feed hole 41 is connected to the waveguide 31 may be changed according to an antenna design.

However, according to one embodiment of the present disclosure, when an upper portion of the feed hole 41 is not connected to the waveguide 31 such that fluid communication is not possible, since an RF signal transmitted through the feed hole 41 may not pass through the waveguide 31, the upper portion of the feed hole 41 should communicate with the waveguide 31.

Figure 8:
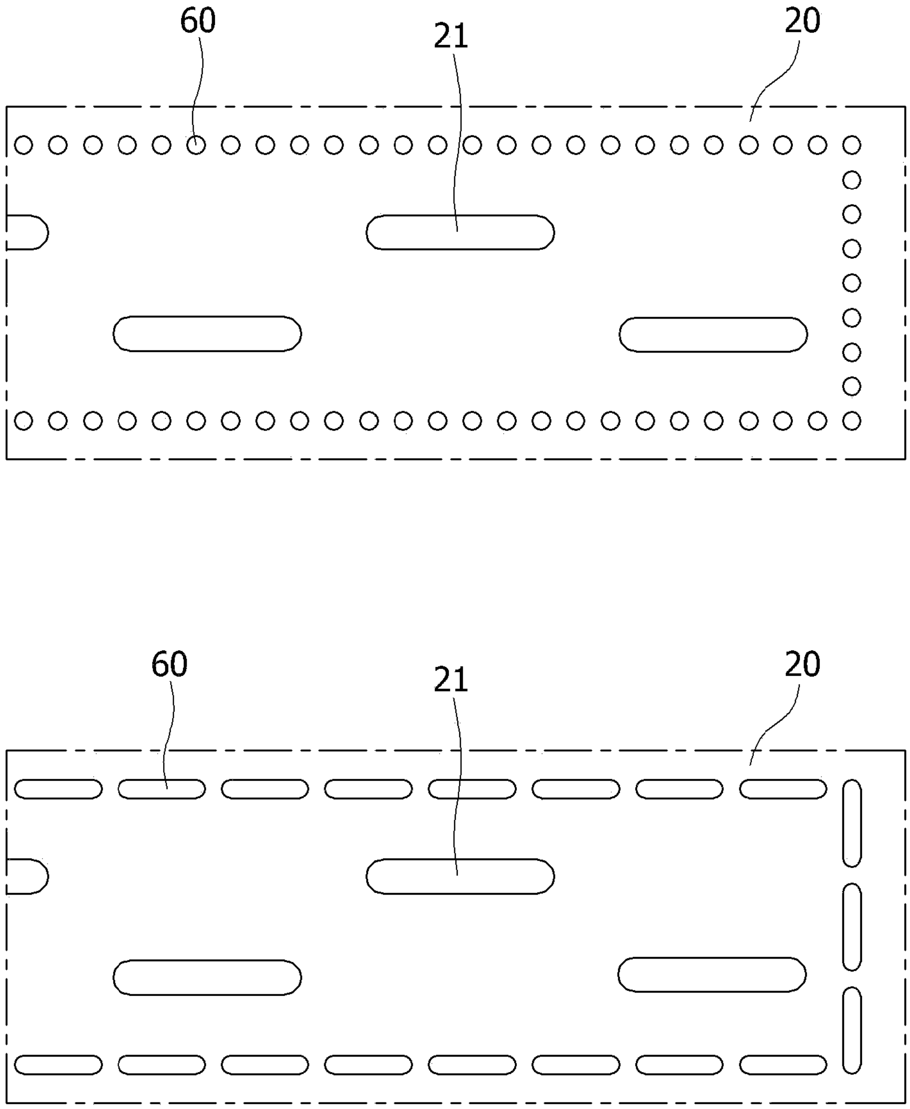
FIG. 8 shows plan views illustrating modified examples of a via hole of the PCB laminated waveguide antenna in a direct feed type in which the metal cover layer in FIG. 1 is omitted.

FIG. 8 shows plan views illustrating modified examples of a via hole of the PCB laminated waveguide antenna structure 10 in a direct feed type according to one embodiment of the present disclosure. FIG. 8(*a*) is a view illustrating a via hole 60 having a circular shape, and FIG. 8(*b*) is a view illustrating a via hole 60' having an oval shape.

Referring to FIGS. 3, 6, and 8(*a*), in one embodiment of the present disclosure, a plurality of via holes 60 passing through three layers are formed in the base layer 40, the waveguide layer 30, and the antenna layer 20.

In this case, referring to FIG. 3, in one embodiment of the present disclosure, the plurality of via holes 60 are disposed to surround the feed hole 41, the waveguide 31, and the antenna hole 21 when viewed in a z-axis direction.

In this case, referring to FIGS. 3 and 4, in one embodiment of the present disclosure, the plurality of via holes 60 are arranged in a rectangular shape extending in an extension direction of the waveguide 31, that is, in the y-axis direction.

In this case, each of the plurality of via holes 60 may be formed in the circular shape as illustrated in FIG. 8(*a*), or the oval shape as illustrated in FIG. 8(*b*), or a quadrangular shape, square shape, rectangular shape, or the like which is not illustrated.

In this case, an extending length of the via hole 60 having the oval shape or the rectangular shape may be changed according to a design.

The plurality of via holes 60 are for preventing radio wave leakage occurring due to gaps between the layers formed by the adhesive layers when the three layers including the antenna layer 20, the waveguide layer 30, and the base layer 40 are bonded by bonding layers 50.

Figure 9:
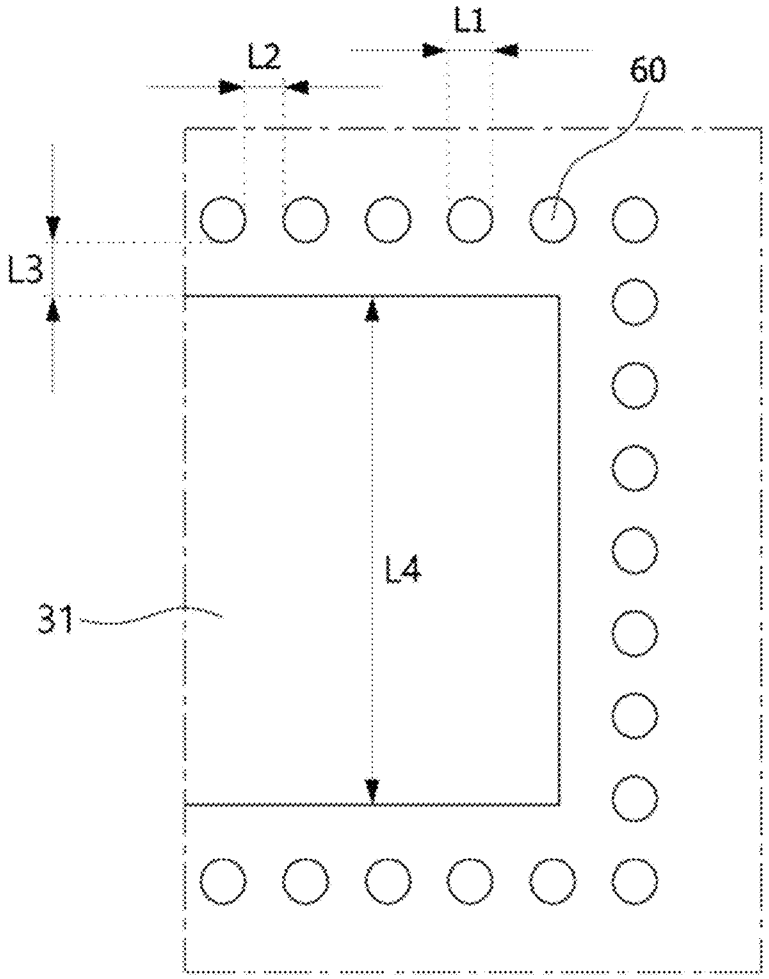
FIG. 9 is a cross-sectional view illustrating distance relationships between a waveguide and the via hole of the PCB laminated waveguide antenna in a direct feed type in which the metal cover layer of FIG. 3 is omitted.

FIG. 9 is a cross-sectional view illustrating distance relationships between the waveguide 31 and the via hole 60 of the PCB laminated waveguide antenna structure 10 in a direct feed type according to one embodiment of the present disclosure.

According to one embodiment of the present disclosure, the via hole 60 is a structure for preventing radio wave leakage at a portion in which a plated layer is not formed, and it is preferable that a gap through which an operation frequency of an RF signal does not pass is maintained.

To this end, a distance L2 between the adjacent via holes 60 may be designed to be ½λ or less of a frequency of an RF signal passing through the waveguide 31.

The distance L2 between the via holes 60 may be designed through a diameter L1, a shape, and a location of each of the via holes 60.

Meanwhile, referring to FIG. 9, a distance L3 from the waveguide 31 to the via hole 60 may be minimum 0.05 mm or more and may be designed in consideration of an operation frequency when designed. The distance L3 from the waveguide 31 to the via hole 60 is too small, it may be difficult to form the via hole 60.

In addition, since the width of the waveguide 31 may be designed according to the diameter L1, the shape, size, and location of the via hole 60, a width L4 of the waveguide 31 may be designed to correspond to the operation frequency.

In this case, the width LA of the waveguide 31 may be designed to have a small value as the operation frequency of the RF signal increases.

Meanwhile, according to one embodiment of the present disclosure, as seen from FIGS. 1 and 2, the metal cover layer 100 is coupled to an upper portion of the antenna layer 20. In one embodiment of the present disclosure, as illustrated in FIG. 2, the metal cover layer 100 may be formed as a single metal layer having the predetermined thickness H1.

In this case, the thickness H1 of the metal cover layer 100 may have one of various thicknesses according to the antenna and the operation frequency and performance of the waveguide, and may be designed to have a thickness of 0 to 2λ of the operation frequency, and be changed according to a design of the antenna.

In one embodiment of the present disclosure, as seen from FIGS. 1 and 2, an opening 110 having a quadrangular shape is formed in the metal cover layer 100. In this case, in FIG. 1, a width of the opening 110 formed in the metal cover layer 100 is denoted as W0, and a length of the opening 110 is denoted as L0.

In this case, the opening 110 may be formed to be smaller than or greater than a rectangular region formed by the via holes 60 formed to surround the antenna layer 20. That is, the via holes 60 may be located inside the opening 110 to be exposed to the outside, or located outside the opening 110 not to be exposed.

Alternatively, only partial portions of the via holes 60 formed to surround the antenna layer 20 may be formed to be exposed upward.

A location and a shape of the opening 110 may be changed according to design conditions of the antenna.

In one embodiment of the present disclosure, any type of metal, such as, copper, gold, silver, or the like having conductivity may be used to form the metal cover layer 100.

In the waveguide antenna including the metal cover layer 100 according to one embodiment of the present disclosure, the metal cover layer 100 may be formed on the waveguide antenna structure to form several types of beam corresponding to user's requirements.

Several changes in beam shape according to the metal cover layer 100 will be described in more detail with reference to the accompanying different drawings.

Figure 10:
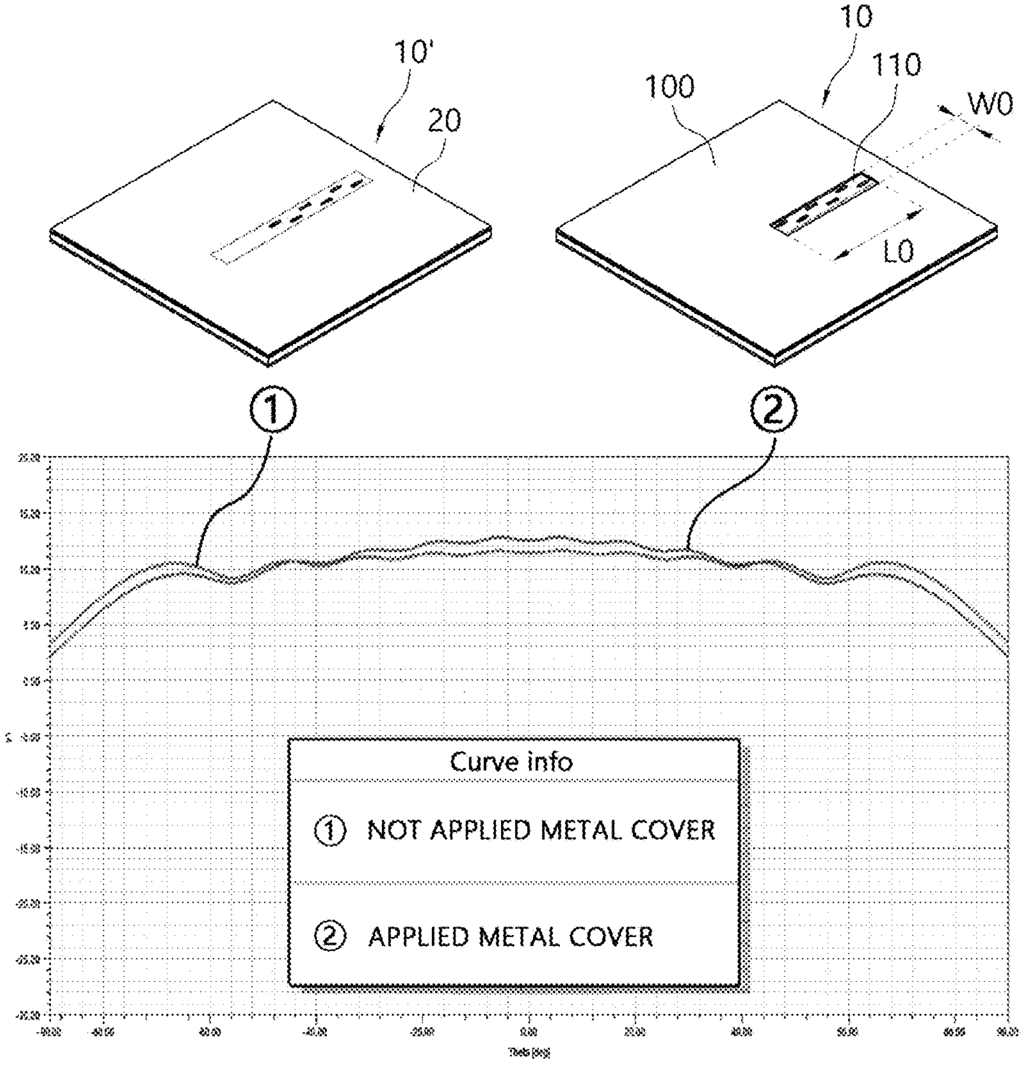
FIG. 10 shows a graph of beam patterns of the PCB laminated waveguide antenna in a direct feed type on which a metal cover layer is laminated according to the first embodiment of the present disclosure, wherein graph ① of FIG. 10 is about a waveguide antenna on which a metal cover layer is not laminated, and graph ② of FIG. 10 is about the waveguide antenna on which the metal cover layer is laminated.

FIG. 10 shows a graph of beam patterns of the PCB laminated waveguide antenna in a direct feed type on which a metal cover layer is laminated according to the first embodiment of the present disclosure, wherein graph ① of FIG. 10 is about a waveguide antenna 10' on which a metal cover layer is not laminated, and graph ② of FIG. 10 is about a waveguide antenna 10 on which the metal cover layer is laminated.

As seen from FIG. 10, when the waveguide antenna 10 on which the metal cover layer is laminated is compared with the waveguide antenna 10' on which a metal cover layer is not laminated, it can be seen that a gain around zero degrees is increased even only by forming the metal cover layer 100, in which the opening 110 is formed, on the waveguide antenna. For example, referring to FIG. 10, the gain is 11.5 dB at zero degrees in graph ①, the gain is 12.5 dB at zero degrees in graph ②, and a gain difference of about 1 dB occurs between two graphs. In FIG. 10, a frequency of the beams of graphs ① and ② is 76.5 GHz.

In this case, the opening 110 formed in the metal cover layer 100 may be formed to have a length L0 corresponding to a length in which a plurality of antenna slots are disposed in a longitudinal direction, and a width W0 of the opening 110 formed in the metal cover layer 100 may be formed to include at least all the plurality of antenna slots.

In this case, the length and the width of the opening 110 formed in the metal cover layer 100 may be formed to be at least zero to smaller than or equal to 2λ (operation frequency) based on an open surface of the antenna. More specifically, since the antenna may not properly operate when the open surface of the antenna is hidden, the length and the width of the opening 110 should be at least zero or more based on the open surface, and increasing the length and the width of the opening 110 to 2λ or more may not have a significant effect in terms of performance.

Figure 11:
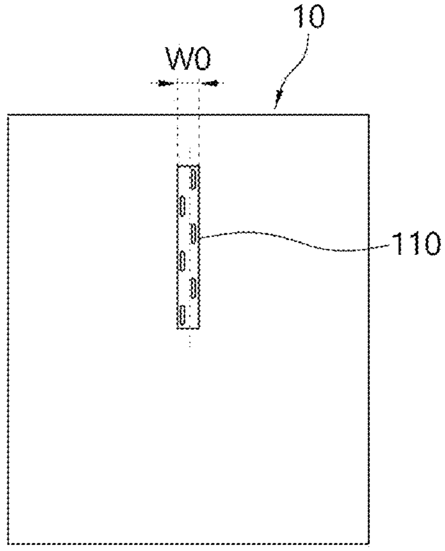
FIG. 11 shows a graph of a beam pattern in a case in which a width of a metal cover of the PCB laminated waveguide antenna in a direct feed type on which a metal cover layer is laminated according to the first embodiment of the present disclosure is adjusted.
Figure 11:
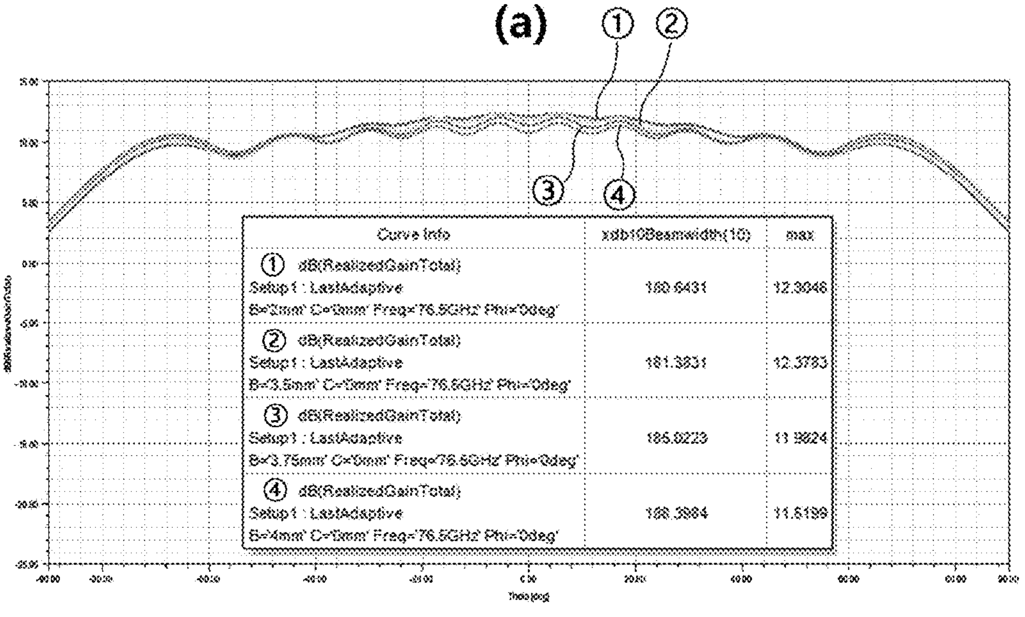

FIG. 11 shows a graph of a beam pattern in a case in which the width W0 of the opening 110 formed in the metal cover of the PCB laminated waveguide antenna in a direct feed type on which a metal cover layer is laminated according to the first embodiment of the present disclosure is adjusted. More specifically, FIG. 11(*a*) is a plan view illustrating the waveguide antenna on which the metal cover layer including the opening 110 having the width W0 is laminated, and FIG. 11(*b*) is a graph illustrating a beam pattern according to a change in width W0 of the opening 110. More specifically, the graph of FIG. 11(*b*) is a graph according to the change in width W0 of the opening, which is a result of a simulation when the width is sequentially increased to 2 mm (graph ①), 3.5 mm (graph ②), 3.7 mm (graph ③, and 4 mm (graph ④) in order from an uppermost graph.

As seen by referring to FIG. 11(*b*), according to one embodiment of the present disclosure, a gain of a formed beam may be changed as the width W0 of the opening 110 formed in the metal cover layer 100 is adjusted.

In this case, the width W0 of the opening 110 of the metal cover layer 100 may be determined based on a center of the antenna slots formed in the waveguide.

More specifically, as seen from FIG. 11(*b*), an aspect is shown that the gain is low when the width W0 of the opening 110 formed in the metal cover layer 100 is wide and the gain is high when the width W0 is narrow. From the graph of FIG. 11(*b*), it can be seen that, as the width W0 of the opening is narrow, the gain at zero degrees is high.

According to one embodiment of the present disclosure, when energy of a beam is concentrated on a center of the opening of the metal cover layer 100, a gain at a portion on which the energy is concentrated may be high. In addition, an amount of a surface current of the metal cover layer 100 may be changed according to the width of the opening 110 formed in the metal cover layer 100.

Accordingly, the gain of the beam may be differently adjusted by decreasing or increasing the width W0 of the opening 110 the metal cover layer 100.

In this case, when widths in both directions of the opening 110 based on the center of the antenna slots in the longitudinal direction are the same, as seen from the graph of FIG. 11(*b*), a pattern of the beam may be formed left and right symmetrically with respect to zero degrees.

Figure 12:
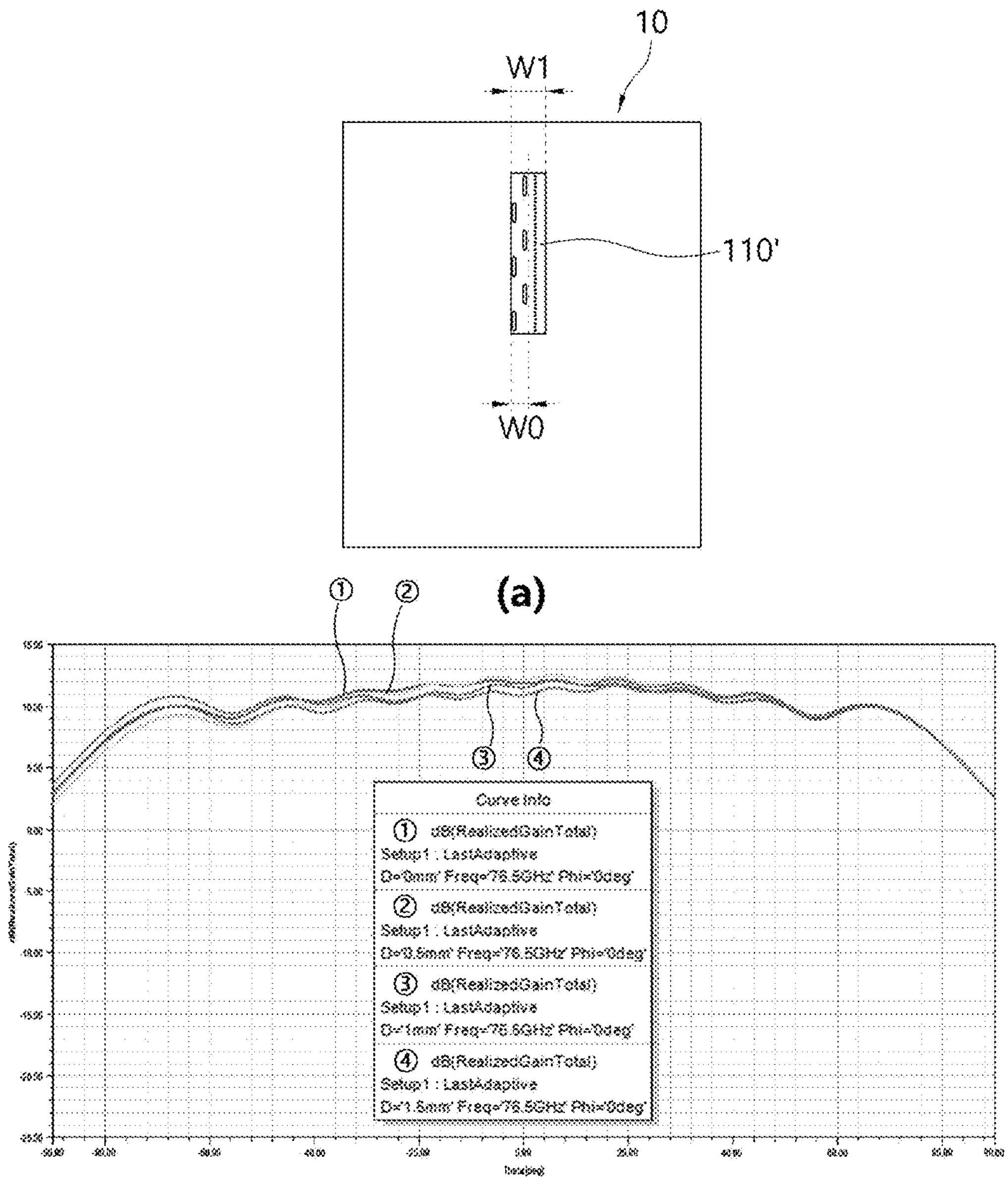
FIG. 12 shows a graph of a beam pattern in a case in which an opening of the metal cover layer of the PCB laminated waveguide antenna in a direct feed type on which a metal cover layer is laminated according to the first embodiment of the present disclosure is offset.

FIG. 12 shows a graph of a beam pattern in a case in which the opening of the metal cover layer of the PCB laminated waveguide antenna in a direct feed type on which a metal cover layer is laminated according to the first embodiment of the present disclosure is offset. More specifically, FIG. 12(*a*) is a plan view illustrating a waveguide antenna on which a metal cover layer including an opening 110' having a width W1 is laminated.

In this case, the opening 110' of FIG. 12 has a width which is greater than the width W0 of the opening 110 of the waveguide antenna in FIG. 11 by the width W1 minus the width W0, and the opening 110' is formed to be wider by the width W1 minus the width W0 in a right direction when being compared with the opening 110 of the waveguide antenna of FIG. 11. That is, the opening 110' of the waveguide antenna of FIG. 12 is formed such that a center of the opening 110' is located at a right side from a center of the antenna hole. FIG. 12(*b*) is a graph showing a beam pattern which is changed according to a change in width W1 of the opening 110'. More specifically, FIG. 12(*b*) shows a result of simulation relating to a change in beam shape according to a value of the width W1 minus the width W0, wherein a graph ① shows a gain when the width W1 and the width W0 are the same, and a graph ②, a graph ③, and a graph ④ are gains measured while the width W1 is increased in 0.5 mm increments.

As seen with reference to FIG. 12(*b*), when the opening of the metal cover layer 110' is offset in a left or right direction from a center of the waveguide slot in FIG. 12, a frequency graph of a beam is changed according to a location of a metal cover. Referring to FIG. 12(*b*), antenna beams are formed to be tilted to one side in order from a graph ②, a graph ③, and a graph ④. Accordingly, it can be seen that an antenna beam can be tilted in a direction in which an offset is changed when the offset of an open surface of the metal cover is changed.

That is, in FIG. 10 or 11, since left and right widths from the center of the waveguide slot are the same, a graph of a beam which is left and right symmetrical with respect to zero degrees is obtained, when the opening is moved a predetermined distance to the right around the waveguide slot as in FIG. 12, that is, the opening is offset, a graph in which a gain deviation is increased by the moved distance in a range from left-90 degrees to zero degrees is obtained as illustrated in FIG. 12.

Accordingly, according to one embodiment of the present disclosure, an antenna design for various shapes of beam gain is possible by manufacturing the antenna waveguide structure to offset the location of the opening formed in the metal cover layer in consideration of a gain range according to an angle of an obtaining target frequency.

Figure 13:
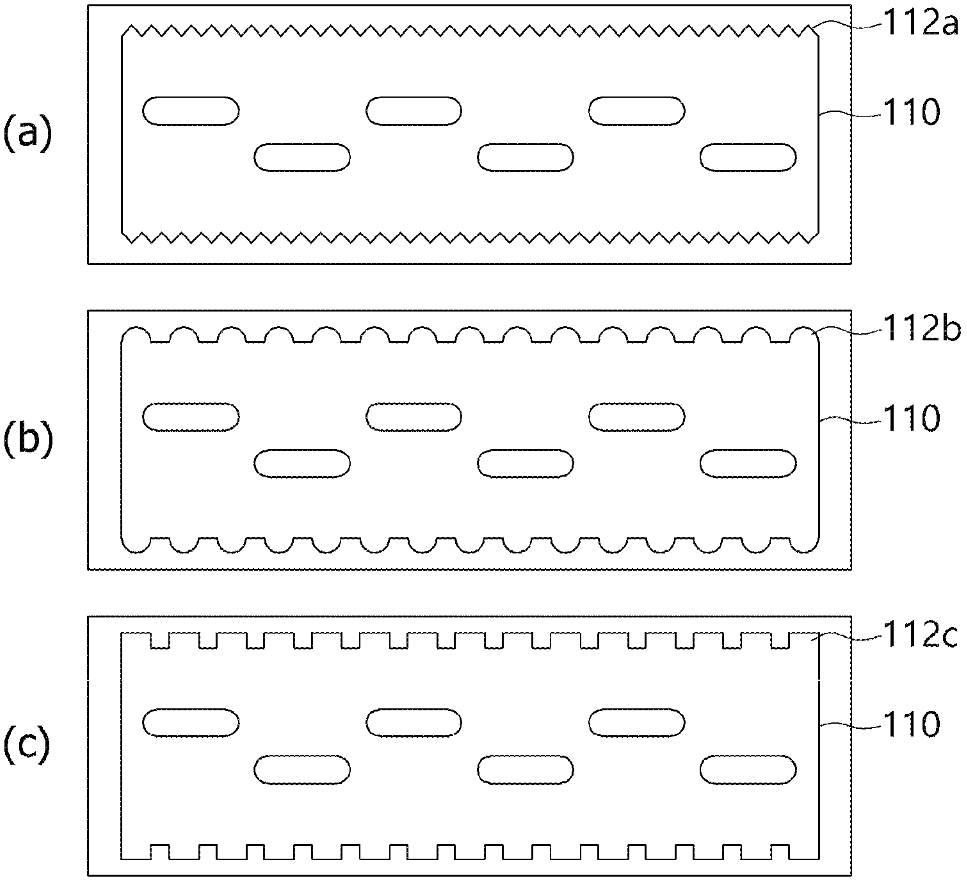
FIG. 13 shows views illustrating modified examples of a metal cover pattern of the PCB laminated waveguide antenna in a direct feed type on which a metal cover layer is laminated according to the first embodiment of the present disclosure.

FIG. 13 shows views illustrating modified examples of a metal cover pattern of the PCB laminated waveguide antenna in a direct feed type on which a metal cover layer is laminated according to the first embodiment of the present disclosure.

Referring to FIG. 13, although a straight type edge of an opening of a metal cover of an antenna may be formed in a rectangular shape as illustrated in FIGS. 11 and 12, as illustrated in FIGS. 13(*a*) to 13(*c*), an inner edge of an opening 110 in an extension direction may be formed in a continuous triangular pattern 112*a* (see FIG. 13(*a*)), an inner edge of an opening 110 in an extension direction may be formed in a pattern 112*b* (see FIG. 13(*b*)) in which a semicircle and a straight line are repeated, or an inner edge of an opening 110 in an extension direction may be formed in a continuous quadrangular pattern 112*c* (see FIG. 13(*c*)).

When an inner edge thereof is formed in one of various edge patterns other than the straight type, a beam having different features may be formed for each pattern. Such edge patterns may be good for suppressing a surface current when being compared with a straight pattern. As a modified example of an edge pattern, for example, when a triangular, quadrangular, or circular pattern is applied, a surface current of a metal cover is suppressed, thereby reducing a fluctuation of an antenna pattern.

Figure 14:
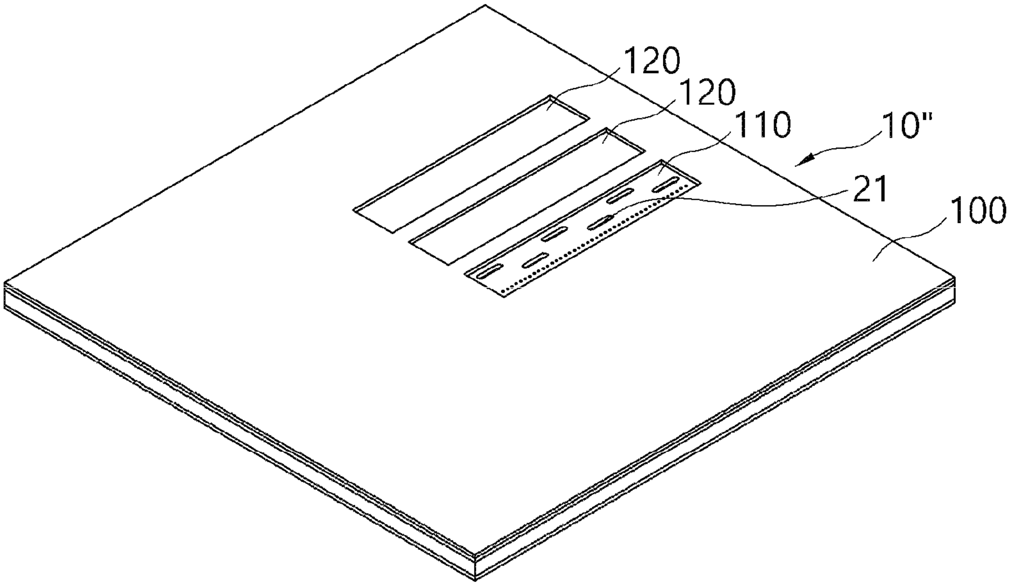
FIG. 14 shows a plan view illustrating a PCB laminated waveguide antenna in a direct feed type on which a metal cover layer is laminated according to a second embodiment of the present disclosure.
Figure 14:
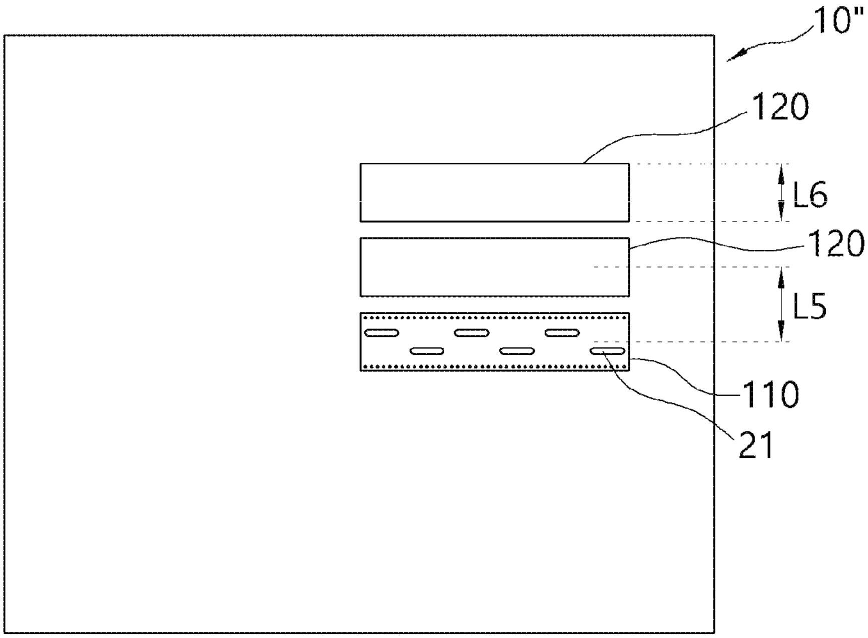

FIG. 14(*a*) is a perspective view illustrating a PCB laminated waveguide antenna 10" in a direct feed type on which a metal cover layer is laminated according to a second embodiment of the present disclosure, and FIG. 14(*b*) is a plan view illustrating the waveguide antenna 10".

Referring to FIGS. 14(*a*) and 14(*b*), an opening 110, of which a center in a width direction matches a center of a plurality of slots 21 in a width direction and which surrounds the plurality of slots 21, and openings 120, which are arranged with the opening in parallel and do not include a plurality of slots, may be formed in a metal cover layer 100.

In the present specification, the opening surrounding the plurality of slots 21 is defined and described as a first opening 110, and the openings which are formed beside the first opening 110 and do not include the plurality of slots 21 are defined and described as second openings 120.

According to the second embodiment of the present disclosure, as seen from FIG. 14, one or more second openings 120 may be formed beside the first opening 110. The number of second openings 120 and shapes thereof may vary and be applied within a physically possible space. A surface current may be suppressed or adjusted according to the number of second openings 120 and the shapes thereof and designed to correspond to an antenna specification.

In this case, as an example, the second opening 120 may have the same shape and size as the first opening 110, and as illustrated in FIG. 14, two second openings 120 may be disposed at a left side of the first opening 110 to be parallel to the first opening 110.

In this case, a distance L5 between central axes of the first opening 110 and the second opening 120 in a longitudinal direction may be designed not to affect an adjacent antenna, and a width L6 of the second opening 120 may be set in a range from zero to 1.5λ of an operation frequency. This may be set in a range in which surrounding antennas or the second openings do not overlap due to the width L6 of the second opening 120.

In addition, in one embodiment of the present disclosure, a thickness of the metal cover layer may be 2λ or less. A phenomenon in which an antenna pattern is repeated based on 1λ occurs. Accordingly, the thickness of the metal cover layer may be greater than zero and smaller than or equal to maximum 2λ.

In the present embodiment, although two second openings 120 are formed, the number of second openings 120 may be greater than, smaller than, or equal to two.

Figure 15:
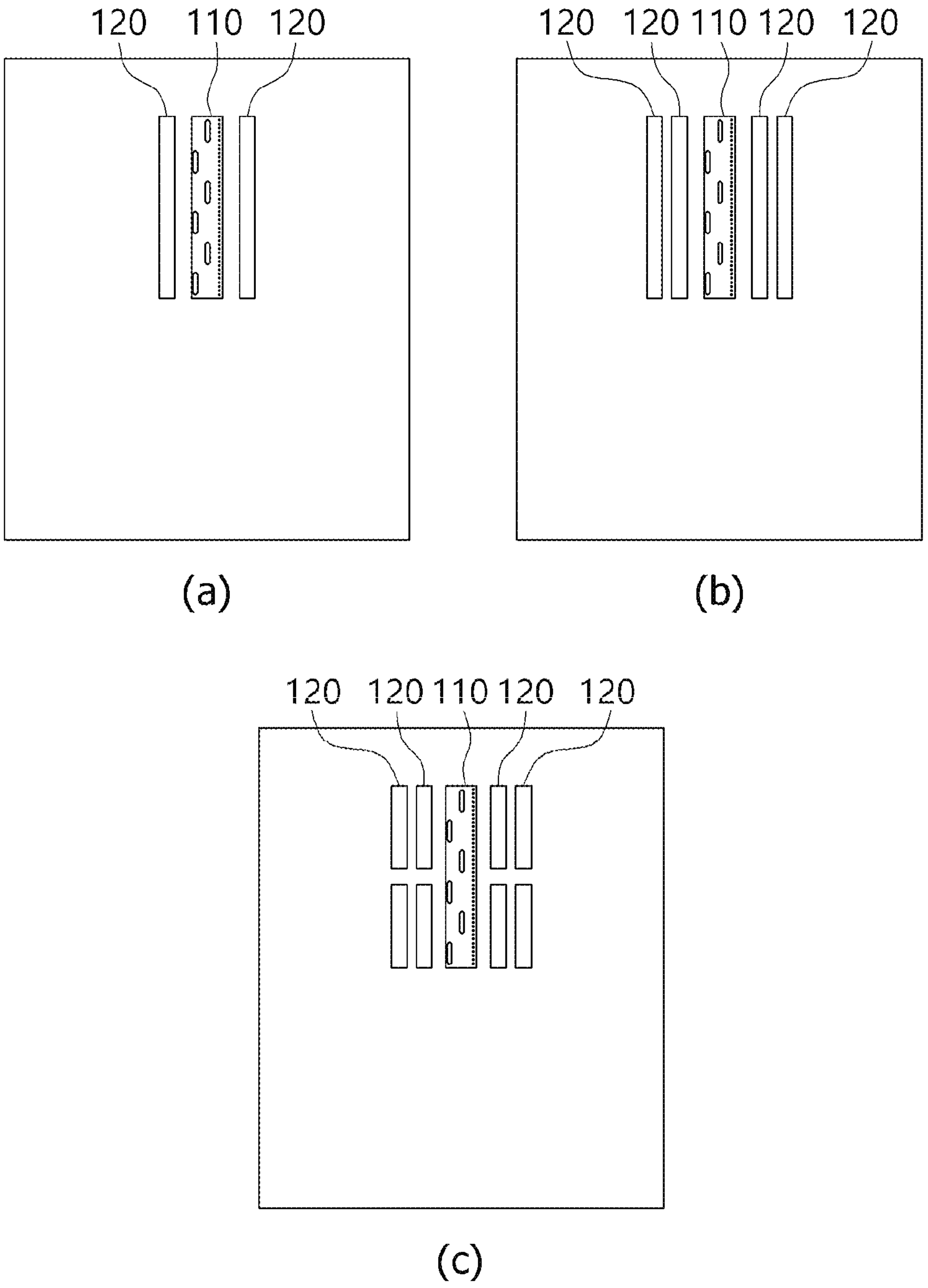
FIG. 15 shows views illustrating modified examples of the PCB laminated waveguide antenna in a direct feed type on which a metal cover layer is laminated according to the second embodiment of the present disclosure.

FIG. 15 shows views illustrating modified examples of the PCB laminated waveguide antenna in a direct feed type on which a metal cover layer is laminated according to the second embodiment of the present disclosure.

Referring to FIG. 15, as modified embodiments of the second embodiment of the present disclosure, one second opening 120 may be disposed at each of both sides of the first opening 110 as illustrated in FIG. 15(*a*). Alternatively, as illustrated in FIG. 15(*b*), two second openings 120 may be disposed at each of both sides of a first opening. The number of second openings 120 and shapes thereof may vary and be applied within a physically possible space. A surface current may be suppressed or adjusted according to the number of second openings 120 and the shapes thereof and designed to correspond to an antenna specification.

In this case, the first opening 110 of the metal cover layer may be an opening having a width W0 as illustrated in FIG. 11, or an opening 110' having a width W1 and offset as illustrated in FIG. 12.

Alternatively, as illustrated in FIG. 15(*c*), the second openings 120 each having a length of about ½ of that of the first opening 110 in the longitudinal direction may be arranged in two columns in the longitudinal direction and two columns in the width direction. A shape of each of the second openings 120 may have a size of ½, ⅓, or ¼ within a physically possible space. Based on an antenna illustrated in FIG. 15(*c*), when a structure may cover an open surface of a metal cover in which six slot antennas are formed, the number of second openings may be divided by n (n is an integer greater than or equal to zero) and arranged. As described above, a surface current may be suppressed or adjusted according to the number of second openings 120 and the shapes thereof and designed to correspond to an antenna specification.

Beams having different frequency characteristics may be formed according to arrangement of the first opening and the second openings having various forms.

According to several embodiments of the present disclosure, those skilled in the art may easily understand and implement that a waveguide antenna structure may be designed to form a beam having various frequency characteristics by combining a length, a width, a change in offset of a first opening and the number, locations, distances, changes in length of second openings and the like.

Figure 16:
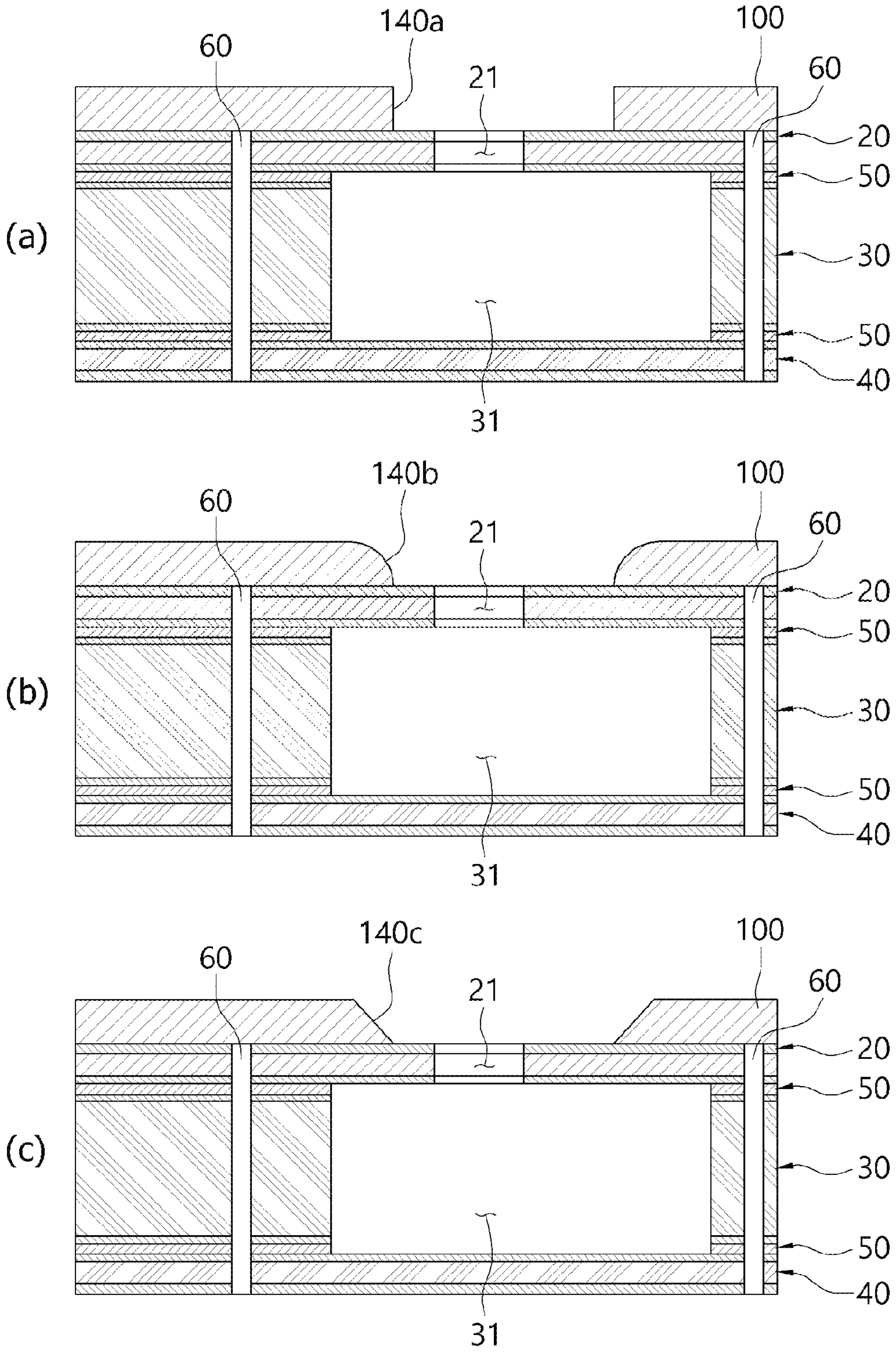
FIG. 16 shows cross-sectional views illustrating various modified examples of a shape of an edge portion of the metal cover of the PCB laminated waveguide antenna in a direct feed type on which a metal cover layer is laminated according to the first embodiment of the present disclosure.

FIG. 16 shows cross-sectional views illustrating various modified examples of a shape of an edge portion of the metal cover of the PCB laminated waveguide antenna in a direct feed type on which a metal cover layer is laminated according to the first embodiment of the present disclosure.

Referring to FIG. 16, as various modified examples of the metal cover layer 100 according to the first embodiment of the present disclosure, an inner surface forming an edge of a first opening 110, a second opening 120, or each of a first opening 110 and second openings 120 may be formed as a vertical surface 140*a* (see FIG. 16(*a*)) perpendicular to an antenna layer or an inclined surface 140*c* (see FIG. 16(*c*)) or a curved surface 140*b* (see FIG. 16(*b*)) of which a width increases upward.

Each of the various edge surfaces 140*a*, 140*b*, and 140*c* of the inner surfaces may be changed according to a method of machining the opening of the metal cover layer 100.

For example, in the case of milling the metal cover layer, as illustrated in FIG. 16(*a*), the inner surface may be formed as the vertical surface perpendicular to the antenna layer, and as illustrated in FIG. 16(*c*), the inner surface may be formed as the inclined surface by molding the metal cover layer 100 using a mold.

Meanwhile, an edge shape of the metal cover layer 100 may be manufactured by milling or chamfering and changed into a fillet shape as in FIG. 16(*b*) by sanding an edge.

In this case, since a curvature of the curved surface or an inclination of the inclined surface of the edge of the opening 110 affects characteristics of a beam, a design of the opening 110 may be performed in consideration of the above-described points when designing the opening.

Meanwhile, similar to the waveguide antenna on which the metal cover layer is laminated according to the above-described various embodiments of the present disclosure, the metal cover layer may be used to be laminated on an antenna having one of various shapes.

Figure 17:
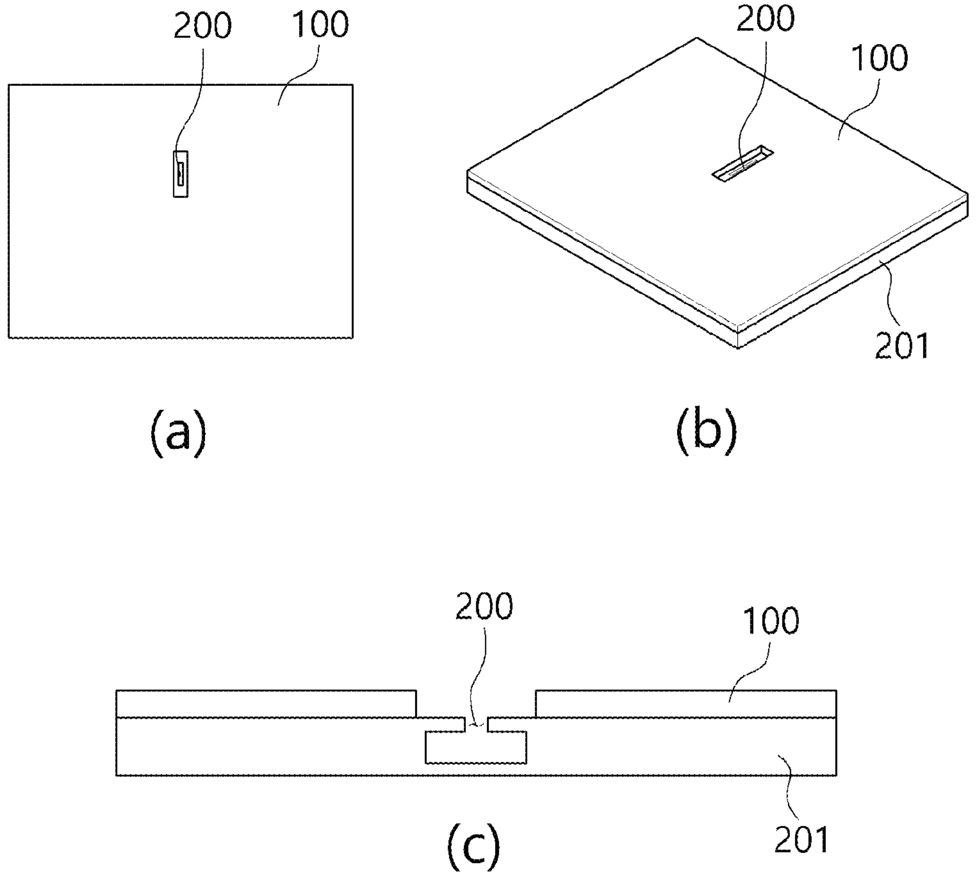
FIG. 17 shows views illustrating a metal cover layer laminated slot antenna, wherein FIG. 17(*a*) is a plan view, FIG. 17(*b*) is a perspective view, and FIG. 17(*c*) is a cross-sectional view.

As an example, as illustrated in FIGS. 17(*a*) to 17(*c*), the metal cover layer 100 may be laminated on a slot antenna 200. Alternatively, as illustrated in FIGS. 18(*a*) to 18(*c*), the metal cover layer 100 may be laminated on a horn antenna 300.

Figure 18:
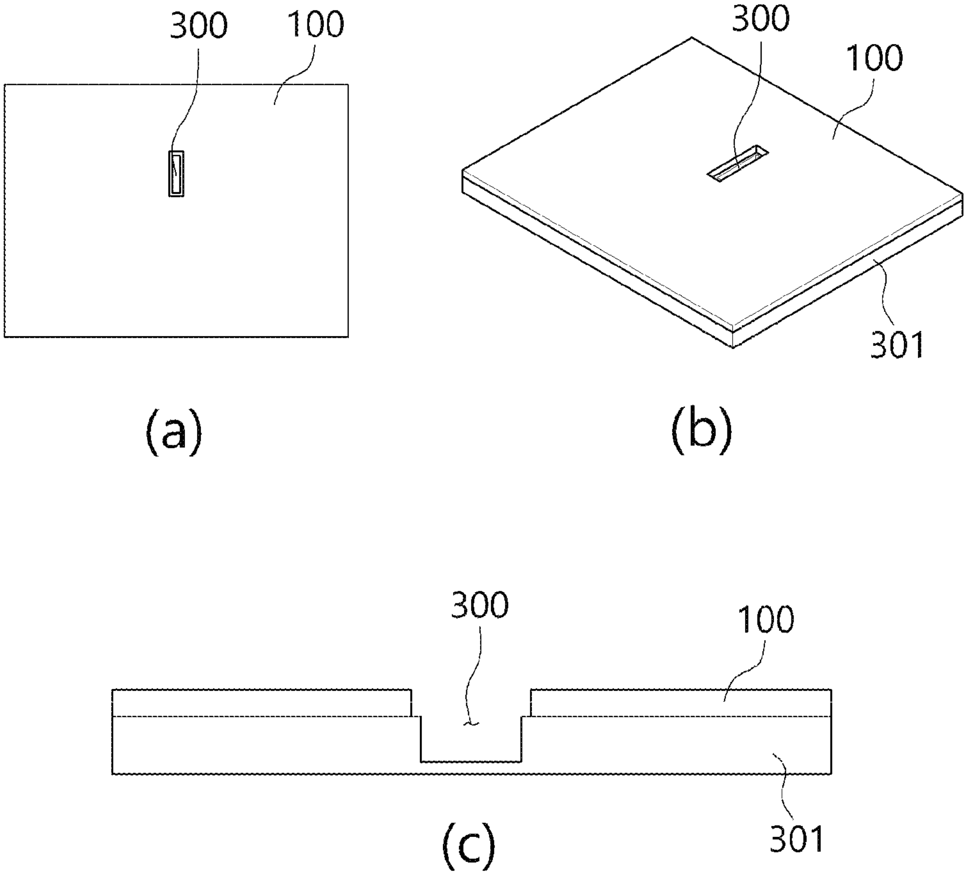
FIG. 18 shows views illustrating a metal cover layer laminated horn antenna, wherein FIG. 18(*a*) is a plan view, FIG. 18(*b*) is a perspective view, and FIG. 18(*c*) is a cross-sectional view.

In this case, the slot antenna 200 of FIGS. 17(*a*) to 17(*c*) or the horn antenna 300 of FIGS. 18(*a*) to 18(*c*) may include a body 201 or 301 formed of a PEC (aluminum) material or a material with conductivity. A waveguide 202 or 302 may be formed in the body 201 or 301 of the slot antenna or the horn antenna, and the slot antenna 200 or the horn antenna 300 may be manufactured by a computer numerical control (CNC) process or injecting and plating processing.

Figure 19:
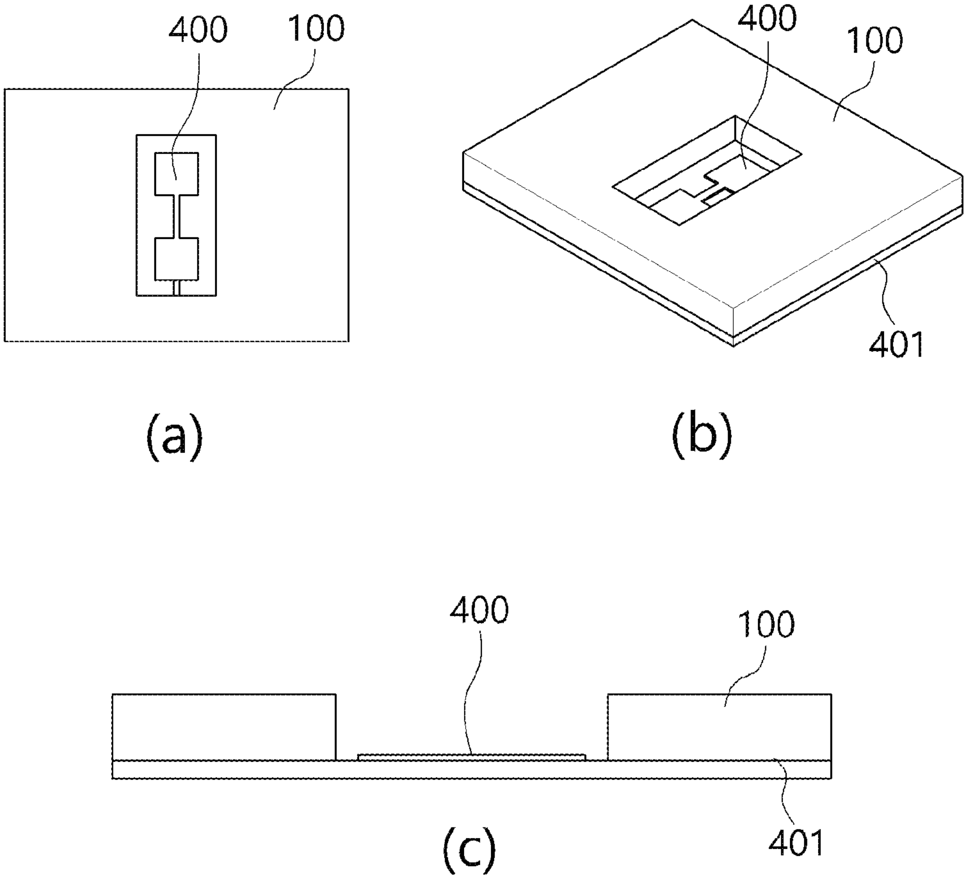
FIG. 19 shows views illustrating a metal cover layer laminated patch antenna, wherein FIG. 19(*a*) is a plan view, FIG. 19(*b*) is a perspective view, and FIG. 19(*c*) is a cross-sectional view.

As another example, as illustrated in FIGS. 19(*a*) to 19(*c*), the metal cover layer 100 may be laminated on a patch antenna 400.

In this case, the patch antenna 400 may be formed on a substrate 401. In addition, the metal cover layer 100 may be formed to be laminated on the substrate 401.

A structure and a design specification of the metal cover described in the waveguide antenna on which the above-described metal cover layer is laminated according to the various embodiments of the present disclosure, and effects according to the structure and design may be equally or similarly applied to the slot antenna 200, the horn antenna 300, or the patch antenna 400 including the metal cover layer 100.

According to the above-described configuration, the waveguide antenna structure including the metal cover layer according to one embodiment of the present disclosure, an RF signal may be directly fed from a monolithic microwave integrated circuit (MMIC) chip which generates the RF signal and transmitted to or received by the waveguide antenna.

In the waveguide antenna structure according to one embodiment of the present disclosure, the waveguide is formed by laminating the PCB substrate, an antenna can be manufactured with a low cost.

In addition, the waveguide antenna structure according to one embodiment of the present disclosure can change a path of an RF signal or signal characteristics using the simple structure in which the metal cover layer is formed on the antenna layer and the opening is formed on the antenna.

In addition, since the waveguide antenna structure according to the embodiment of the present disclosure uses a direct feed type, signal loss occurring while a signal is transitioned form the conventional microstrip to the waveguide can be reduced.

It should be understood that the effects of the present disclosure are not limited to the above-described effects and include all effects inferable from a configuration of the disclosure described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

The invention claimed is:

1. A waveguide antenna structure comprising:

a base layer in which a feed hole is formed;

a waveguide layer laminated on the base layer and including a waveguide communicating with the feed hole;

an antenna layer laminated on the waveguide layer and including an antenna for transmitting or receiving a signal passing through the feed hole and the waveguide to or from an outside; and a metal cover layer laminated on the antenna layer and including a first opening surrounding the antenna to change a path of a radio wave transmitted or received through the antenna, wherein the antenna is a slot antenna, wherein the slot antenna includes a plurality of slots disposed in an upper portion thereof in an extension direction of the waveguide, wherein the first opening is formed in a rectangular shape surrounding the plurality of slots and extending in the extension direction of the waveguide, and wherein a pattern of consecutive triangular, semicircular, or quadrangular shapes forms a boundary of each of both sides of an inner surface of the first opening in an extension direction.

2. The waveguide antenna structure of claim 1, wherein each of the metal cover layer, the antenna layer, the waveguide layer, and the base layer includes:

a substrate layer; and a first protection layer and a second protection layer laminated on an upper surface and a lower surface of the substrate layer, respectively.

3. The waveguide antenna structure of claim 2, wherein:

the substrate layer is formed of a flame retardant FR-4 material; and the first protection layer and the second protection layer are formed of a conductive material that allows plating to be performed thereon.

4. The waveguide antenna structure of claim 1, wherein:

a plurality of via holes passing through the base layer, the waveguide layer, and the antenna layer which are laminated on each other are formed in the base layer, the waveguide layer, and the antenna layer; and the plurality of via holes are disposed to surround the feed hole, the waveguide, and the antenna.

5. The waveguide antenna structure of claim 4, wherein:

the plurality of via holes are disposed in a rectangular shape; and an arrangement length of the plurality of via holes disposed in an extension direction of the waveguide is formed to be greater than a length of the plurality of via holes disposed in a width direction.

6. The waveguide antenna structure of claim 1, wherein:

the plurality of slots are arranged in two columns in the extension direction of the waveguide; and adjacent slots from different columns are misaligned with each other.

7. The waveguide antenna structure of claim 1, wherein a center of the first opening in a width direction is formed to match a center of the plurality of slots in the width direction.

8. The waveguide antenna structure of claim 1, wherein a center of the first opening in a width direction is laterally offset from a center of the plurality of slots in the width direction.

9. The waveguide antenna structure of claim 1, wherein a second opening which has a rectangular shape and is parallel to the first opening is formed at one side or each of both sides of the first opening.

10. The waveguide antenna structure of claim 9, wherein a size and a shape of the second opening correspond to the first opening.

11. The waveguide antenna structure of claim 9, wherein:

the second opening is disposed as one or more second openings at one side or each of both sides of the first opening; and the one or more second openings are disposed at the one or each of both sides of the first opening in parallel to be spaced apart from each other.

12. The waveguide antenna structure of claim 1, wherein an inner surface of the first opening is formed as a vertical surface perpendicular to the antenna layer or an inclined or curved surface of which a width increases upward.

13. The waveguide antenna structure of claim 1, wherein a width of the first opening ranges from zero to 1.5λ, and wherein λ is a wavelength corresponding to an operation frequency of the waveguide antenna structure.

14. The waveguide antenna structure of claim 1, wherein a thickness of the metal cover layer ranges from zero to 2λ, and wherein λ is a wavelength corresponding to an operation frequency of the waveguide antenna structure.

15. A waveguide antenna structure comprising:

a base layer in which a feed hole is formed;

a waveguide layer laminated on the base layer and including a waveguide communicating with the feed hole;

an antenna layer laminated on the waveguide layer and including an antenna for transmitting or receiving a signal passing through the feed hole and the waveguide to or from an outside; and a metal cover layer laminated on the antenna layer and including a first opening and a second opening each having a quadrangular shape extending in an extension direction of the waveguide, wherein the first opening surrounds the antenna, wherein the second opening does not surround the antenna, is free of an antenna structure therein, is disposed in parallel with the first opening surrounding the antenna, and is spaced apart from the first opening.

16. The waveguide antenna structure of claim 15, wherein a center of the first opening surrounding the antenna in a width direction matches or is offset from a center of the antenna in a width direction.

17. The waveguide antenna structure of claim 15, wherein a size and a shape of the second opening correspond to the first opening.

18. The waveguide antenna structure of claim 15, wherein:

the second opening is disposed as one or more second openings at one side or each of both sides of the first opening; and the one or more second openings are disposed at the one or each of both sides of the first opening in parallel to be spaced apart from each other.

* * * * *